US012031644B2

(12) United States Patent
Tani et al.

(10) Patent No.: US 12,031,644 B2
(45) Date of Patent: Jul. 9, 2024

(54) TUBULAR FORMED BODY, AND STORAGE STRUCTURE (71) Applicant: KYORAKU CO., LTD., Kyoto (JP)

(72) Inventors: Naoto Tani, Nagoya (JP); Masaaki Onodera, Nagoya (JP); Yuichi Ishida, Toyohashi (JP); Satoru Kinoshita, Toyohashi (JP)

(73) Assignee: KYORAKU CO., LTD., Kyoto (JP)

( * ) Notice: Subject to any disclaimer, the term of this patent is extended or adjusted under 35 U.S.C. 154(b) by 814 days.

(21) Appl. No.: 17/260,350

(22) PCT Filed: Jul. 26, 2019

(86) PCT No.: PCT/JP2019/029335
§ 371 (c)(1),
(2) Date: Jan. 14, 2021

(87) PCT Pub. No.: WO2020/022466
PCT Pub. Date: Jan. 30, 2020

(65) Prior Publication Data
US 2021/0293358 A1 Sep. 23, 2021

(30) Foreign Application Priority Data

Jul. 26, 2018 (JP) .................... 2018-140094
Sep. 6, 2018 (JP) .................... 2018-166766

(51) Int. Cl.
*F16L 11/12* (2006.01)
*B02C 18/22* (2006.01)
(Continued)

(52) U.S. Cl.
CPC .......... *F16L 11/12* (2013.01); *B02C 18/2216* (2013.01); *B02C 23/20* (2013.01);
(Continued)

(58) Field of Classification Search
None
See application file for complete search history.

(56) References Cited

U.S. PATENT DOCUMENTS 2,570,910 A * 10/1951 Berry .................. F21S 4/20
362/221
4,570,854 A * 2/1986 Wernhart ............. A01G 25/095
239/176
(Continued)

FOREIGN PATENT DOCUMENTS

EP 0885148 B1 10/2002
JP S57-95909 U 6/1982
(Continued)

OTHER PUBLICATIONS

Partial supplementary European Search Report issued on Jul. 21, 2021, in connection with corresponding EP Application No. 19840089.7; 11 pages.
(Continued)

*Primary Examiner* — Joseph A Dillon, Jr.
(74) *Attorney, Agent, or Firm* — Maier & Maier, PLLC (57) ABSTRACT A tubular molded body that can reduce restrictions on attachment to another member to be easily attached to another member. The tubular molded body 10 includes a tube main body 11 formed in a tubular shape and an attachment flange 100 formed in a flange shape to project from the tube main body 11. The attachment flange 100 includes a thin-walled hinge 130 and is rotatable by the hinge.

4 Claims, 11 Drawing Sheets (51) Int. Cl.
  *B02C 23/20* (2006.01)
  *B02C 23/28* (2006.01)
  *B29C 31/02* (2006.01)
  *B65G 65/40* (2006.01)
  *B29K 23/00* (2006.01)
  *B29K 105/04* (2006.01)
  *B29K 105/26* (2006.01)
  *B29L 23/00* (2006.01)

(52) U.S. Cl.
  CPC ............... *B02C 23/28* (2013.01); *B29C 31/02* (2013.01); *B65G 65/40* (2013.01); *B29K 2023/06* (2013.01); *B29K 2023/12* (2013.01); *B29K 2105/046* (2013.01); *B29K 2105/26* (2013.01); *B29L 2023/22* (2013.01)

(56) References Cited

U.S. PATENT DOCUMENTS

| | | | | |
|---|---|---|---|---|
| 6,357,172 | B1* | 3/2002 | Risgaard | A01G 13/0243 47/32.4 |
| 8,474,880 | B2* | 7/2013 | Gill | F16L 23/036 285/368 |
| 8,991,097 | B2* | 3/2015 | Giametta | A01G 9/029 47/5.5 |
| 9,257,822 | B2* | 2/2016 | Kitamura | H02G 3/32 |
| 11,045,982 | B2* | 6/2021 | Onodera | B29C 44/3469 |
| 2003/0042219 | A1 | 3/2003 | Crider | |
| 2013/0052377 | A1 | 2/2013 | Tani et al. | |
| 2015/0045467 | A1 | 2/2015 | Sano et al. | |
| 2017/0232657 | A1 | 8/2017 | Olson | |
| 2021/0363318 | A1* | 11/2021 | Onodera | B29C 49/0005 |

FOREIGN PATENT DOCUMENTS

| | | |
|---|---|---|
| JP | S60-18335 A | 1/1985 |
| JP | S61-111717 U | 7/1986 |
| JP | H05-75470 U | 10/1993 |
| JP | 2013-63639 A | 4/2013 |
| WO | 2013/111692 A1 | 8/2013 |

OTHER PUBLICATIONS

International Search Report issued on Oct. 15, 2019 in corresponding International application No. PCT/JP2019/029335; 10 pages.
Office Action issued on Feb. 21, 2024, in corresponding Korean Application No. 10-2021-7005931, 18 pages.

* cited by examiner

TUBULAR FORMED BODY, AND STORAGE STRUCTURE

FIELD

The present invention relates to a tubular molded body and a storage structure.

BACKGROUND

As a prior art, a tubular molded body, such as a duct formed by blow molding, provided with an attachment flange with an attachment hole for attaching and fixing to another member has been disclosed. Patent Literature 1 discloses the attachment flange formed on a parting line of the tubular molded body, which is a foam molded body obtained by blow molding a foam plastic material.

In the conventional molding of resin material by a blow molding machine and an injection molding machine, yield is improved by molding a mixture of virgin resin material and recovered resin material. For example, Patent Literature 2 discloses a manufacturing method in which the virgin resin material and the recovered resin material are mixed to produce the foam molded product by blow molding.

PATENT LITERATURE

[Patent Literature 1] JP-A-2013-63639
[Patent Literature 2] WO2013/111692A1

SUMMARY

The attachment flange is usually formed on the parting line of the tubular molded body. This is because it is more efficient to form the attachment flange by making use of a part of a burr generated in blow molding the tubular molded body. However, it may not be possible to provide the tubular molded body with the attachment flange parallel to a parting surface including the parting line, depending on the shape of the member to which the attachment flange is fixed and mounting conditions of the attachment flange. In such a case, the attachment flange needs to be mounted as a retrofit component to the tubular molded by welding or the like, which may complicate product structure and increase cost and time for production.

The recovered resin material is generated in a predetermined size (e.g., in the particle size of about 5 mm to 10 mm) by pulverizing waste material in molding, such as burrs of the product and a runner. The material after being pulverized (pulverized material) is stored in a storage case and is sucked from a suction nozzle in the storage case to be mixed with the virgin resin material. The pulverized material stored in the storage case contains powdery pulverized material having the particle size of about 1 mm to 2 mm in a certain proportion. A cavity is often formed around the suction nozzle when the pulverized material around the suction nozzle is sucked. Consequently, the powdery pulverized material enters between particles of the pulverized material of a predetermined size and solidifies, and a so-called bridge is formed around the cavity. The formed bridge is usually broken by hand after stopping a machine, which can reduce the process efficiency of molding. In particular, this bridge may be frequently generated in molding foam material.

The present invention provides a tubular molded body that can reduce restrictions on the attachment to another member to be easily attached to another member and provides a storage structure of the pulverized material that can improve the process efficiency of molding.

The tubular molded body of the present invention comprises a tube main body formed in a tubular shape; and an attachment flange formed in a flange shape to project from the tube main body, the attachment flange comprising a thin-walled hinge and being rotatable by the hinge.

The storage structure of the present invention comprises a storage case for storing pulverized material; and a screw blade rotatably provided in the storage case to move the pulverized material in the storage case.

The present invention can provide a tubular molded body that can reduce restrictions on the attachment to another member to be easily attached to another member. Further, the present invention can provide a storage structure that can improve the process efficiency of molding.

BRIEF DESCRIPTION OF DRAWINGS

FIG. 6B is a schematic plan view showing modified examples of the tubular molded body according to the embodiment of the present invention showing Variation 2.

DETAILED DESCRIPTION OF EMBODIMENTS

Figure 1:
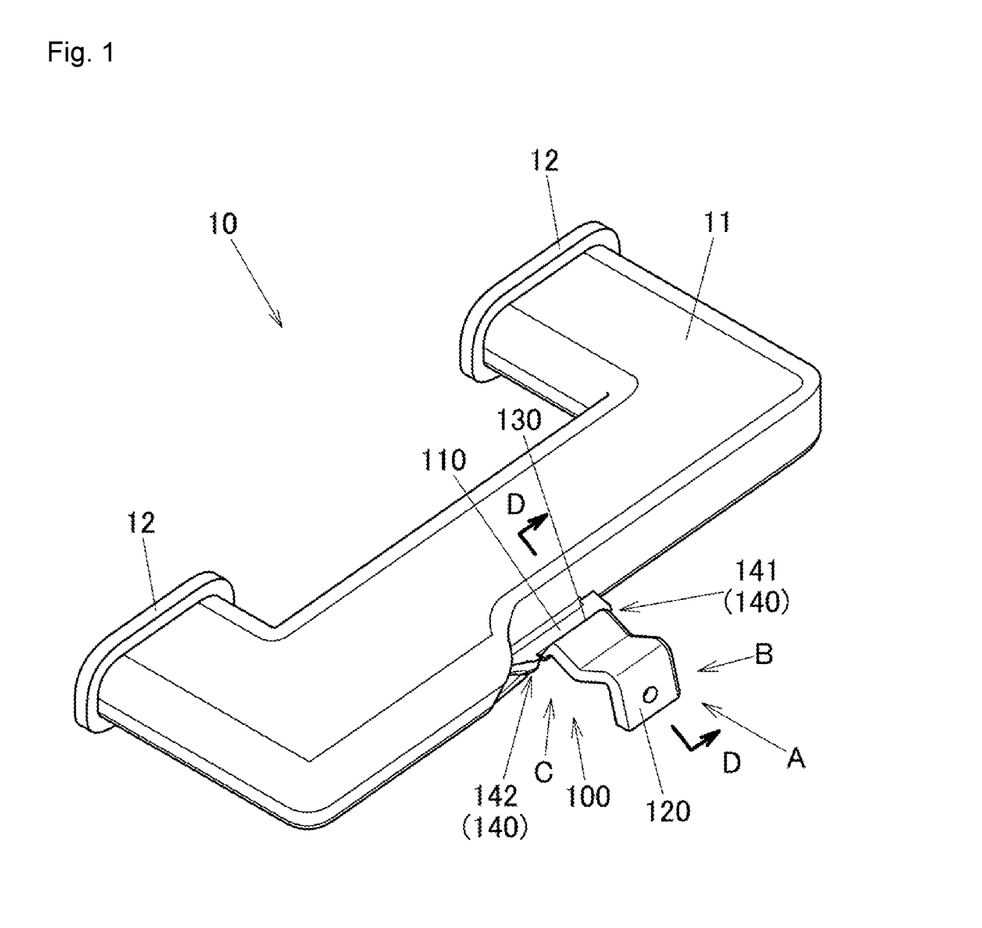
FIG. 1 is a perspective view showing a tubular molded body according to an embodiment of the present invention.

Next, an embodiment of the present invention (tubular molded body) is described with reference to the drawings. A tubular molded body 10 according to the present embodiment shown in FIG. 1 is a duct used for air conditioning equipment and the like. The tubular molded body 10 is formed by blow molding thermoplastic mixed resin mixed with a foaming agent to have a closed cell structure. Examples of this thermoplastic resin include polyolefin resin, such as polyethylene resin and polypropylene resin. The polyolefin-based resin is excellent in flexibility, and thus the impact resistance of the tubular molded body 10 can be improved. Among these, the thermoplastic resin including a propylene unit is preferably used, and specific examples thereof include a propylene homopolymer, an ethylene-propylene block copolymer, and an ethylene-propylene random copolymer. Further, among these, the propylene homopolymer having a long-chain branched structure is particularly preferable. In this case, the melt tension becomes higher, which allows foaming to occur easily and makes the bubble cell more uniform.

The thermoplastic resin described above is foamed with a foaming agent before being blow-molded. Examples of such a foaming agent include inorganic foaming agents, such as air, carbon dioxide gas, nitrogen gas, and water, and organic foaming agents, such as butane, pentane, hexane, dichloromethane, and dichloroethane. Among these, it is preferable to use air, carbon dioxide gas or nitrogen gas as the foaming agent. In this case, solid or liquid can be prevented from being mixed, and thus the deterioration of durability and the like can be suppressed.

A tube main body 11 of the tubular molded body 10 is a tubular body having a U-shaped outer shape. Both ends of the tube main body 11 are opened to form a flange 12. An attachment flange 100 is formed on a long straight portion of the tube main body 11. The attachment flange 100 is a portion fixed to another member when the tubular molded body 10 is attached. The attachment flange 100 is formed in a flange shape (in other words, a plate shape) to project from the tube main body 11.

The attachment flange 100 includes a fixed flange 110 and an attachment flange main body 120, as shown in FIG. 2 to FIG. 5B. The fixed flange 110 is formed in a long plate shape to project from the tube main body 11. The attachment flange main body 120 is formed in a bent shape in which an elongated rectangular plate is bent. Specifically, as shown in FIG. 5A, the attachment flange main body 120 includes a short first plate portion 121 rising at a proximal end, a second plate portion 122 connected to the first plate portion 121 at an angle of approximately 90 degrees, a third plate portion 123 connected to the second plate portion 122 at an angle of approximately 60 degrees toward an upper side of FIG. 5A, a fourth plate portion 124 connected perpendicularly to the third plate portion 123 with its tip pointing downwardly, and an attachment hole 125 penetrating the fourth plate portion 124. The attachment flange main body 120 is formed to have the same width from the first plate portion 121 to the fourth plate portion 124. The attachment flange main body 120 is connected to the fixed flange 110 via a hinge 130. The hinge 130 is formed in a thin wall along a longitudinal direction of the fixed flange 110. For example, the thickness of the hinge 130 is formed to be about 0.1 mm. The hinge 130 allows the attachment flange main body 120 of the attachment flange 100 to be easily rotated manually. That is, the hinge 130 is formed in a thin wall so that it can be manually rotated.

Figure 2:
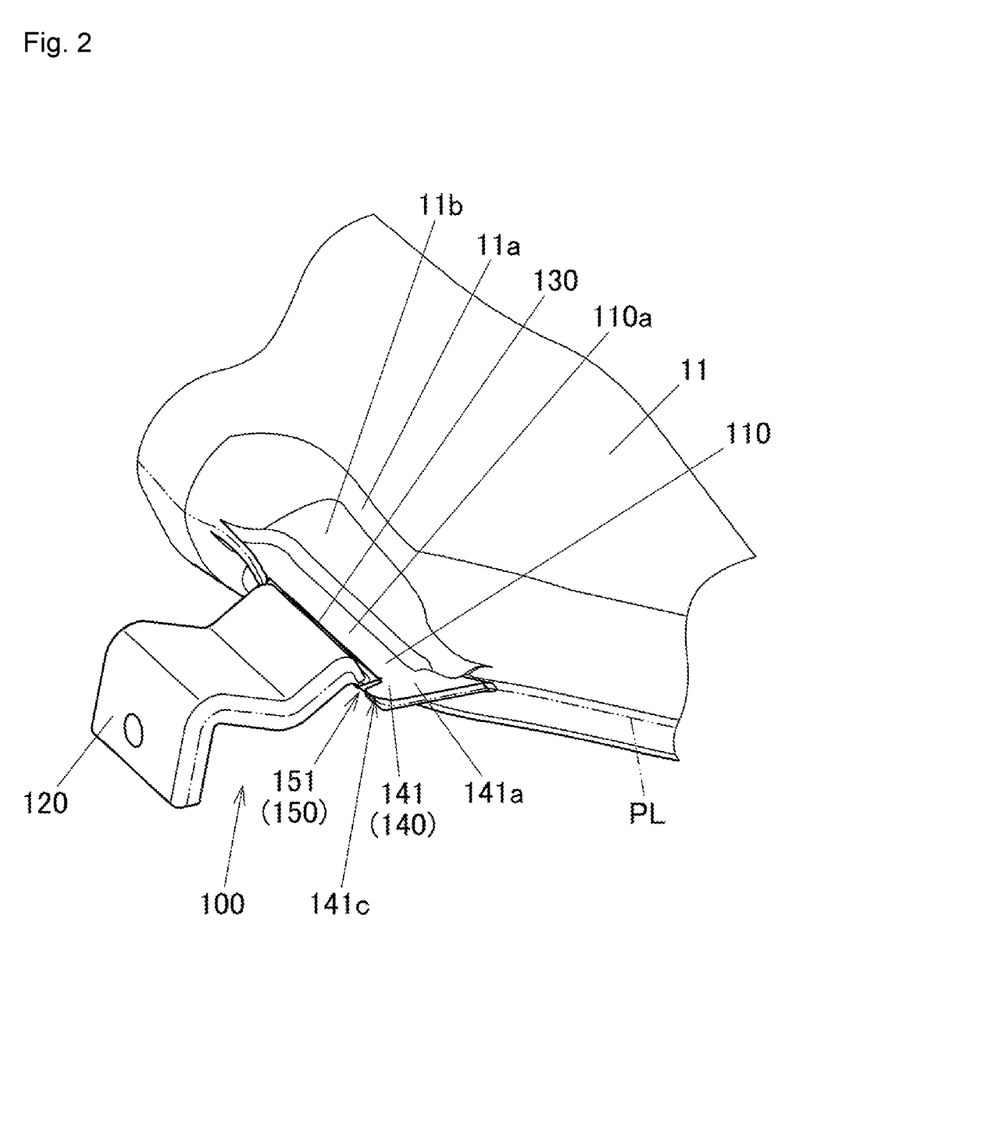
FIG. 2 is an enlarged perspective view of the periphery of an attachment flange of the tubular molded body according to the embodiment of the present invention as viewed from a direction A in FIG. 1.
Figure 3:
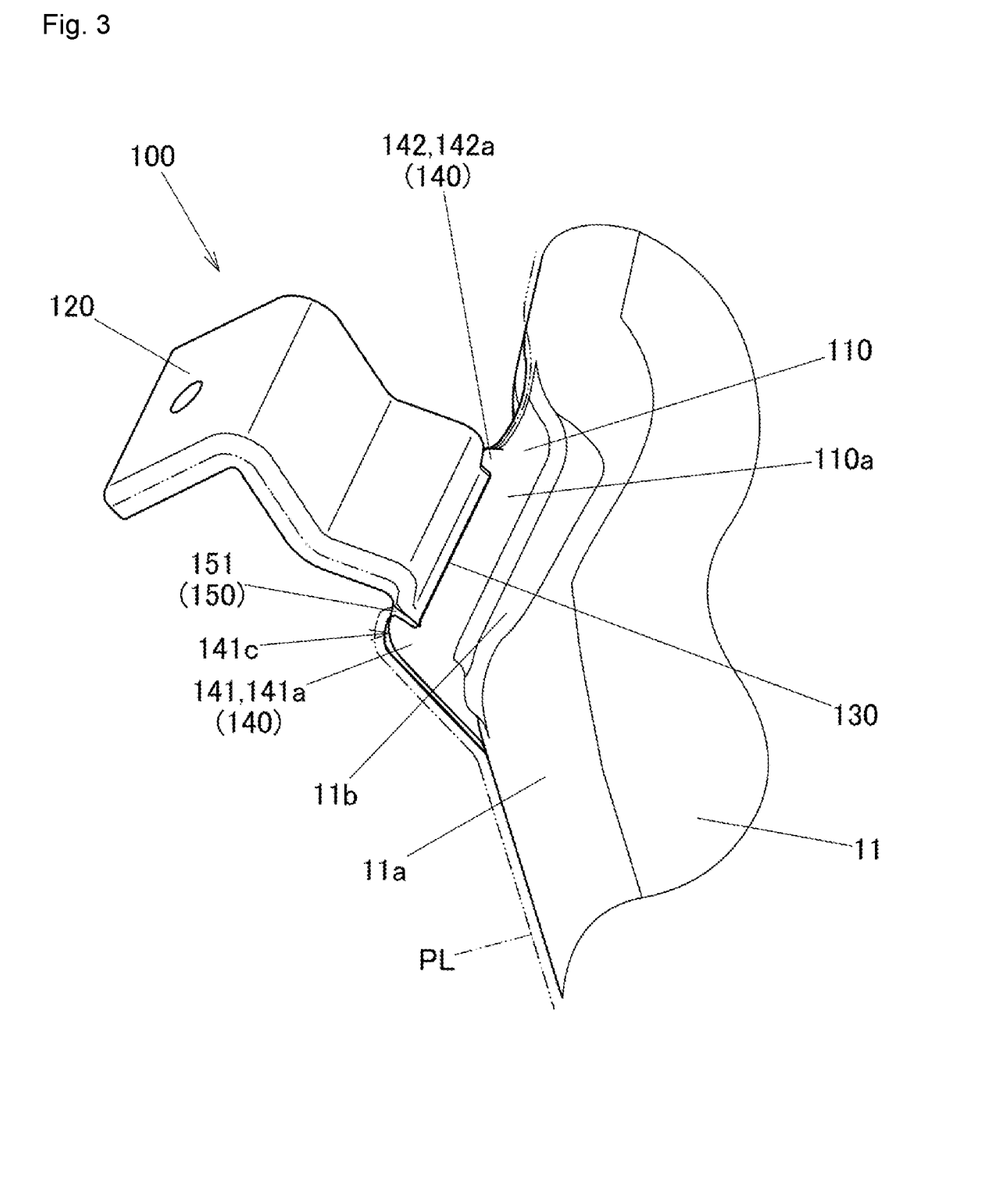
FIG. 3 is an enlarged perspective view of the periphery of the attachment flange of the tubular molded body according to the embodiment of the present invention as viewed from a direction B in FIG. 1.
Figure 4:
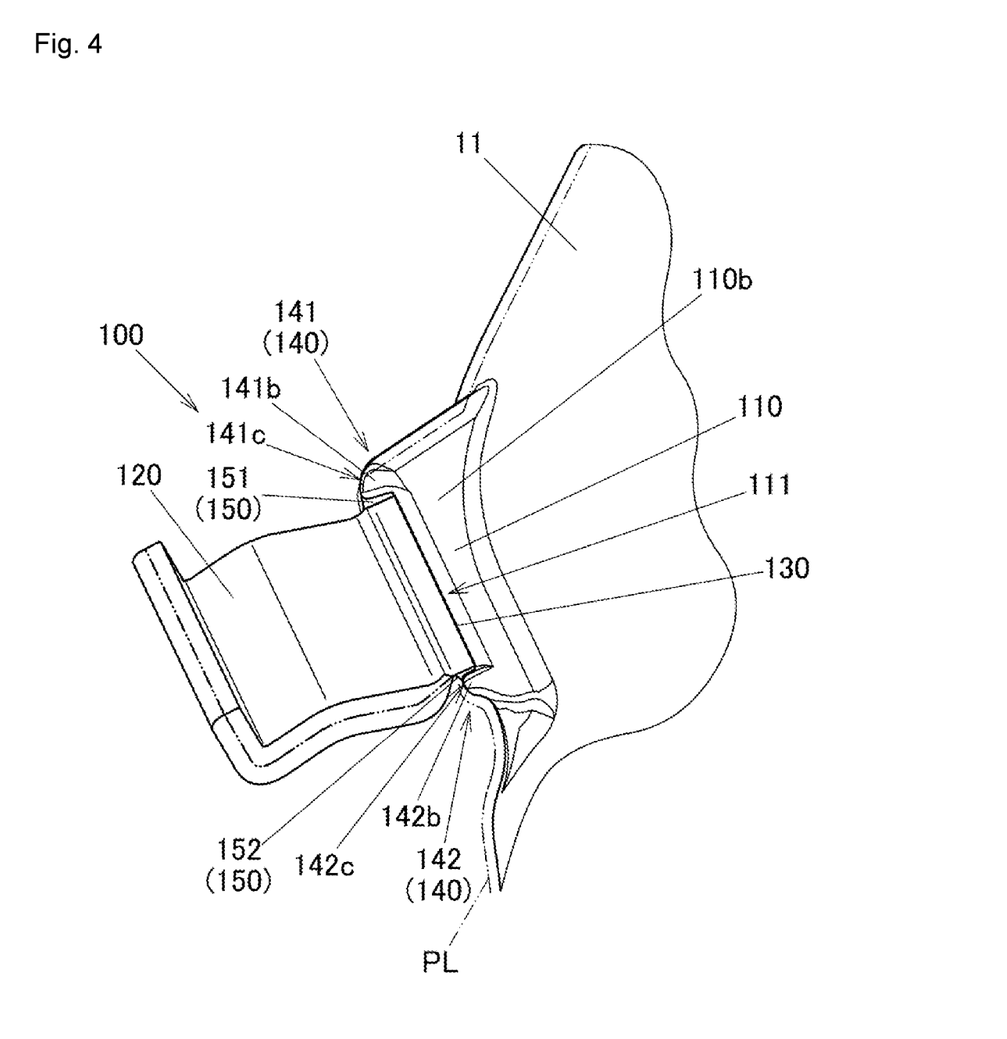
FIG. 4 is an enlarged perspective view of the periphery of the attachment flange of the tubular molded body according to the embodiment of the present invention as viewed from a direction C (a lower side of the attachment flange) in FIG. 1.

Further, as shown in FIG. 2 to FIG. 4, a hinge protection portion 140 protruding in a bell shape is formed near both ends of the hinge 130. Here, the hinge protection portion 140 on a left side in a projecting direction of the attachment flange 100 is referred to as a left hinge-protection portion 141, and the hinge protection portion 140 on a right side is referred to as a right hinge-protection portion 142. Upper surfaces 141a, 142a of the left hinge-protection portion 141 and the right hinge-protection portion 142 are both formed as flat surfaces continuous with an upper surface 110a of the fixed flange 110. Further, lower surfaces 141b, 142b of the left hinge-protection portion 141 and the right hinge-protection portion 142 are continuous with a lower surface 110b of the fixed flange 110 at their base and have an inclined surface or an R-chamfered arc surface toward tip portions 141c, 142c. Further, a front edge of the lower surface 110b of the fixed flange 110 is formed to fall toward the hinge 130, and a concave portion 111 is formed by the front edge of the fixed flange 110, facing surfaces of the hinge protection portion 140 (the left hinge-protection portion 141, the right hinge-protection portion 142), and a lower surface of the first plate portion 121 of the attachment flange main body 120. The tip portions 141c, 142c of the hinge protection portion 140 are formed to protrude beyond the hinge 130 in the projecting direction of the attachment flange 100. Consequently, a step is formed from the tip portions 141c, 142c of the hinge protection portion 140 to the hinge 130 to fall toward the tube main body 11.

A side plate portion 150 is provided between the hinge protection portion 140 and the attachment flange 100. Specifically, a left side-plate portion 151 is provided between the left hinge-protection portion 141 and the first plate portion 121 of the attachment flange main body 120 (including a connected portion between the first plate portion 121 and the second plate portion 122). Similarly, a right side-plate portion 152 is provided between the right hinge-protection portion 142 and the first plate portion 121 of the attachment flange main body 120 (including a connected portion between the first plate portion 121 and the second plate portion 122). Further, the side plate portion 150 (the left side-plate portion 151 and the right side-plate portion 152) is formed in a thin wall extending from both ends of the hinge 130 in the projecting direction of the attachment flange 100. The thickness of the side plate portion 150 (the left side-plate portion 151 and the right side-plate portion 152) is, for example, about 0.5 mm. The side plate portion 150 is sufficiently thinner than the attachment flange main body 120 and thicker than the hinge 130.

Figure 5A:
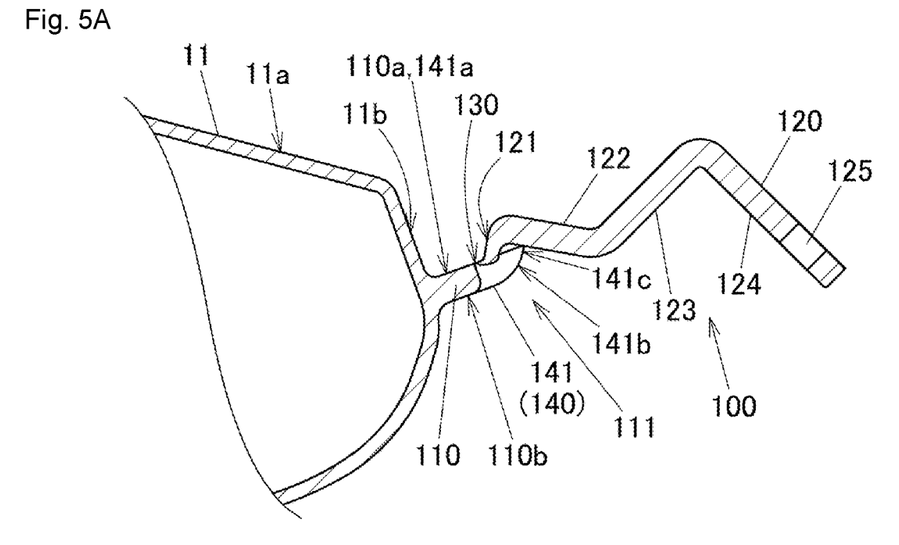
FIG. 5A is an enlarged cross-sectional views taken along a D-D line of the tubular molded body according to the embodiment of the present invention in FIG. 1 showing a state before rotating an attachment flange main body.
Figure 5B:
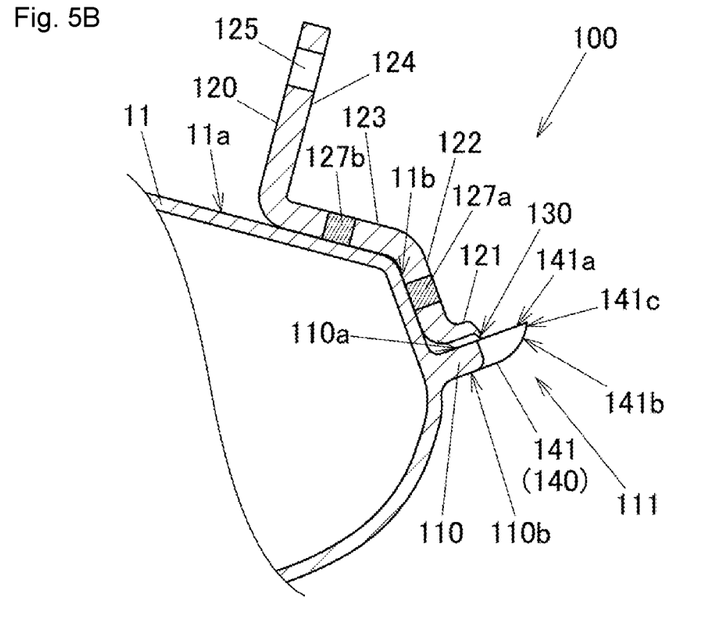
FIG. 5B is an enlarged cross-sectional view taken along a D-D line of the tubular molded body according to the embodiment of the present invention in FIG. 1 showing a state where the attachment flange is rotated to abut against the tube main body.

The hinge 130 enables the tubular molded body 10 including the attachment flange 100 formed as described above to rotate until the attachment flange main body 120 of the attachment flange 100 abuts against the tube main body 11, as shown in FIG. 5B. When the attachment flange main body 120 rotates, the side plate portions 150 provided between the hinge protection portion 140 and the attachment flange 100 (the left side-plate portion 151 and the right side-plate portion 152) is broken. When the attachment flange 100 abuts against the tube main body 11, an upper surface of the second plate portion 122 abuts against a perpendicular flat surface 11b of the tube main body 11 close to the attachment flange 100, and an upper surface of the third plate portion 123 abuts against an inclined flat surface 11a on a substantially upper surface side of the tube main body 11. Further, welded portions 127a, 127b are firmly welded by ultrasonic welding or the like to connect the second plate portion 122 and the perpendicular flat surface 11b and to connect the third plate portion 123 and the inclined flat surface 11a. Consequently, the attachment hole 125 of the attachment flange 100 is arranged above the tube main body 11.

In this way, the attachment hole 125 for the attachment to another member can be arranged above the tube main body 11 at a position other than the position along a parting line PL. Further, since the attachment flange main body 120 of the attachment flange 100 is formed in a bent shape, the flat surfaces can abut against each other between the second plate portion 122 and the perpendicular flat surface 11b and between the third plate portion 123 and the inclined flat surface 11a. Therefore, the rotated attachment flange 100 can be easily welded and fixed to the tube main body 11.

In this regard, the parting line PL around the attachment flange 100 in blow molding the tubular molded body 10 is formed on a side surface of the hinge protection portion 140 and the attachment flange main body 120, as shown in the chain double-dashed line in FIG. 2 to FIG. 4. Since a parison formed larger than the tubular molded body 10 is sandwiched between molds and blow-molded to mold the tubular molded body 10, a large burr is formed on the outside of the tubular molded body 10 along the parting line PL. Therefore, the burr needs to be removed to obtain the tubular molded body 10 as a product. The burr is removed by cutting with a tool, such as a cutter, or by tearing it off by hand. It may be better to tear it off by hand in consideration of the work efficiency of removing the burr. Even if the burr from the tube main body 11 to the attachment flange main body 120 is removed, the hinge protection portion 140 can avoid tearing off the hinge 130 with the removal of the burr.

For example, when the hinge protection portion 140 is not provided, the thin-walled hinge 130 may be torn when the portion between the tubular molded body 10 and the burr is cut along the parting line PL since the PL and the hinge 130 are connected substantially linearly. If the hinge 130 is formed to be thinner for rotatability, the risk of tearing the hinge 130 is increased. On the other hand, when the hinge protection portion 140 is provided, the risk of damaging the hinge 130 when the portion between the tubular molded body 10 and the burr is cut along the PL can be reduced since the PL and the hinge 130 are indirectly connected via the side plate portion 150 (i.e., not directly connected). Further, the side plate portion 150 is provided between the hinge protection portion 140 and the attachment flange 100, so that the risk of damaging the hinge 130 can be reduced even if the attachment flange main body 120 receives a force in a direction of tearing the hinge 130 associated with tearing off the burr, because the attachment flange main body 120 is supported by the hinge protection portion 140 via the side plate portion 150. In this regard, it is preferable to set the thickness of the side plate portion 150 to be larger than the thickness of the hinge 130, as the thickness of the hinge 130 is set to be about 0.1 mm and the thickness of the side plate portion 150 is set to be 0.5 mm in the present embodiment. When the thickness of the side plate portion 150 is set to be larger than the thickness of the hinge 130, it is possible to achieve a good balance between preventing damage to the hinge 130 and improving the rotatability of the hinge 130 when tearing the burr along the parting line PL as described above.

(Variation 1)

Figure 6A:
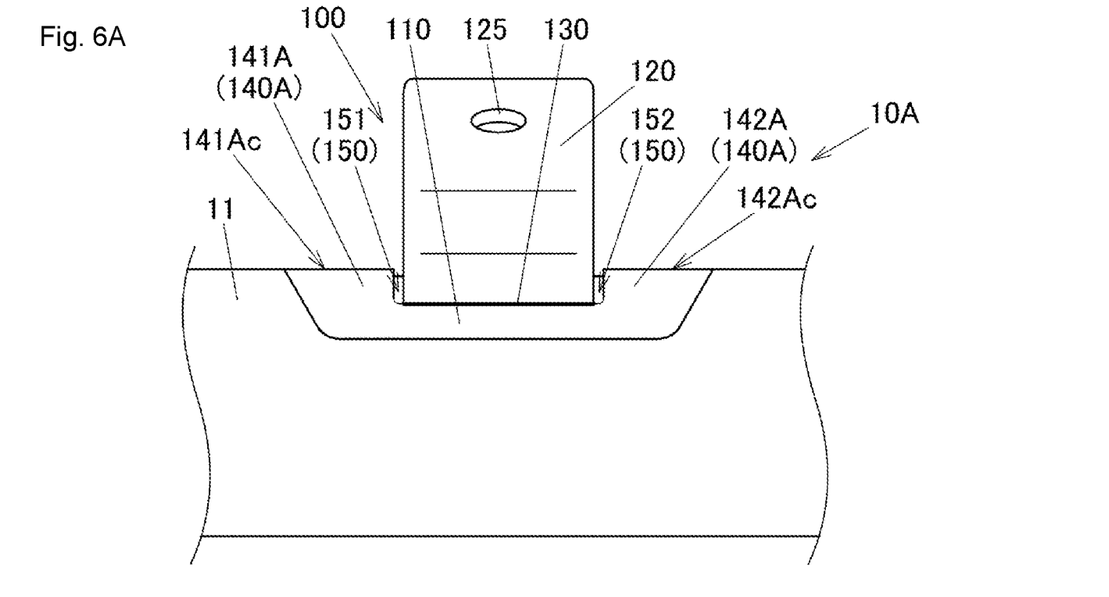
FIG. 6A is a schematic plan views showing modified examples of the tubular molded body according to the embodiment of the present invention showing Variation 1 and FIG. 6B shows Variation 2.

A variation (Variation 1) of the present embodiment is shown in FIG. 6A. In the present variation, the tubular molded body 10A includes a hinge protection portion 140A (a left hinge-protection portion 141A and a right hinge-protection portion 142A) having tip portions 141Ac, 142Ac linearly continuous with the tube main body 11, instead of the bell-shaped hinge protection portion 140 in the aforementioned embodiment. In the tubular molded body 10A, the tip portions 141Ac, 142Ac of the hinge protection portion 140A are formed on a projecting side of the attachment flange 100 beyond the hinge 130.

(Variation 2)

Figure 6B:
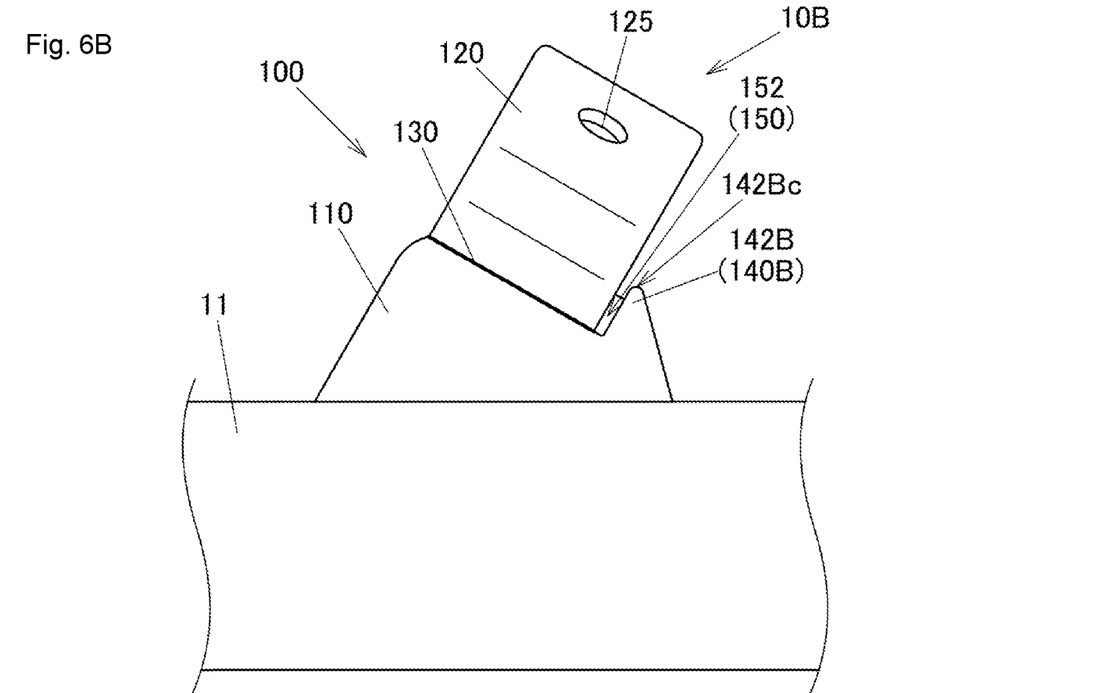

Another variation (Variation 2) of the present embodiment is shown in FIG. 6B. In the present variation, a tubular molded body 10B includes a hinge protection portion 140B (a right hinge-protection portion 142B) provided on one side, instead of the hinge protection portions 140, 140A provided on the left and right sides. In the present variation, the hinge 130 is formed to be inclined with respect to the tube main body 11. In this way, a tip portion 142Bc of the hinge protection portion 140B (the right hinge-protection portion 142B) may be formed on the projecting side of the attachment flange 100 beyond a portion of the hinge 130. However, in this case, the burr needs to be torn off along the PL from a side where the hinge protection portion 140B (the right hinge-protection portion 142B) is provided. Further, the side plate portion 150 is formed only on a right side (the right side-plate portion 152).

The embodiment of the present invention has been described above, and the present invention is not limited to the present embodiment and can be implemented with various modifications. For example, while, in the present embodiment, the attachment flange 100 is rotated by the hinge 130 to directly abut on the tube main body 11 (the inclined flat surface 11a and the perpendicular flat surface 11b), a boss or the like may be projected from the tube main body 11, or another boss-shaped member may be attached to the tube main body 11 so that the boss can abut on the attachment flange 100.

Figure 7:
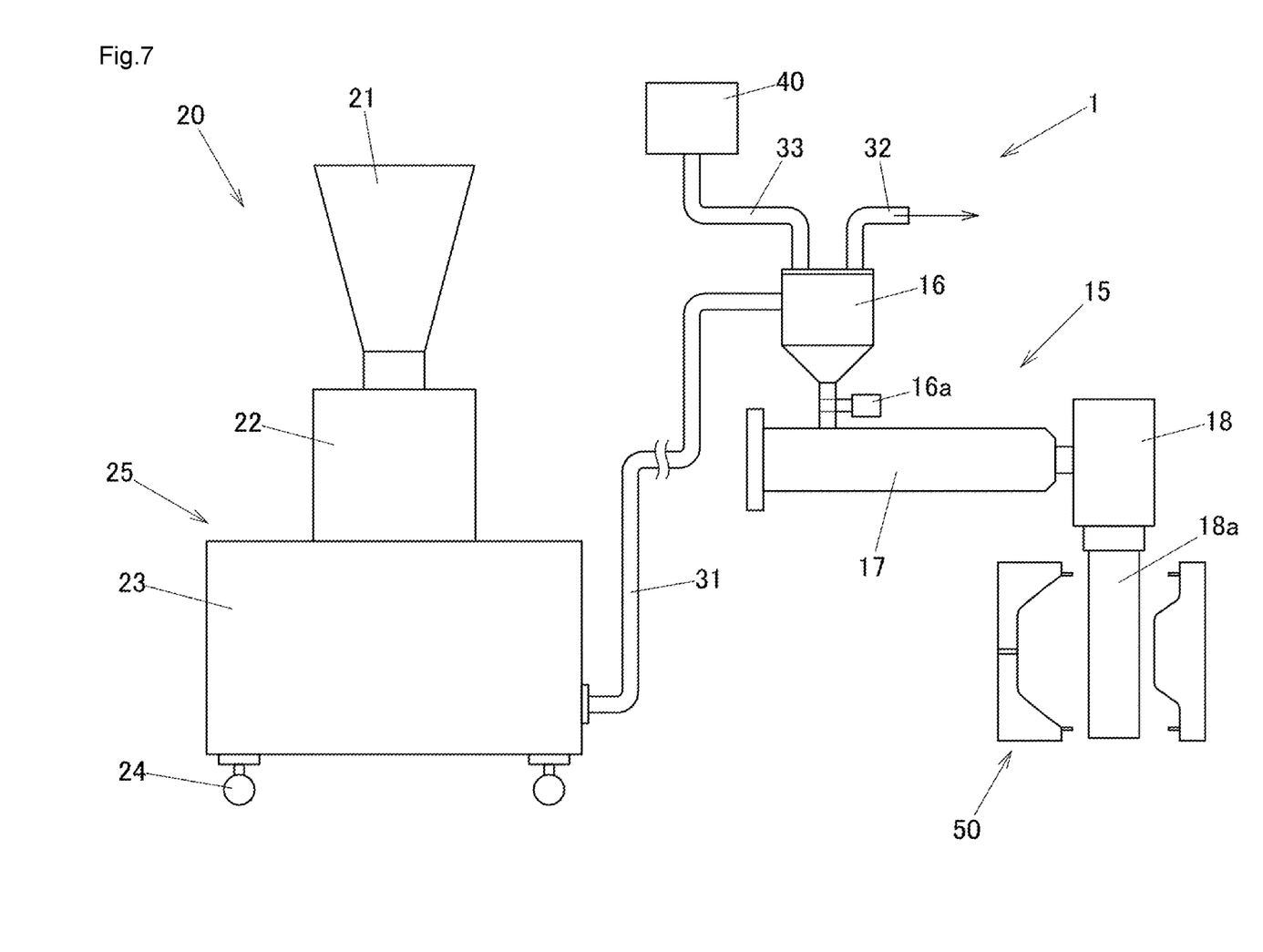
FIG. 7 is a schematic view showing a blow molding system comprising a pulverizer according to the embodiment of the present invention.

Next, the embodiment (storage structure) of the present invention will be described. FIG. 7 is a schematic view of a blow molding system 1. The blow molding system 1 includes a blow molding machine 15 and a pulverizer 20. The blow molding system 1 is configured to produce pulverized material by pulverizing, with the pulverizer 20, waste material, such as burrs, generated during molding by the blow molding machine 15. This pulverized material (recovered resin material) is recovered from the pulverizer 20 and mixed with virgin resin material to be used again for blow molding by the blow molding machine 15.

The blow molding machine 15 includes a mixer 16 configured to prepare mixed resin material in which the virgin resin material and the recovered resin material are mixed at a predetermined ratio. The mixer 16 communicates with an extruder 17, and the mixed resin material is supplied to the extruder 17 as appropriate by opening and closing an opening/closing cylinder 16a provided on a communication passage. A head 18 is provided at the tip of the extruder 17. The mixed resin material supplied to the extruder 17 is heated and kneaded inside the extruder 17, and a parison 18a is formed by the head 18. The parison 18a is molded into a product by a mold 50 for blow molding. The molded product in the present embodiment is a duct or the like and is formed by foam molding to have a closed cell structure.

The pulverizer 20 includes a hopper 21 having an inlet for feeding the waste material, a pulverizing unit 22 pulverizing the waste material to generate the pulverized material, and a storage unit 25 including a storage case 23 for storing the pulverized material and a screw blade described later to constitute the storage structure. The hopper 21, the pulverizing unit 22, and the storage unit 25 are configured continuously in the vertical direction, so that the material can sequentially drop into the pulverizer 20. Casters 24 are provided on a lower surface of the storage case 23. The storage case 23 communicates with the mixer 16 of the blow molding machine 15 via a communication passage 31. A communication passage 32 connected to a decompression pump (not shown) is connected to the mixer 16. The pulverized material stored in the storage case 23 is fed into the mixer 16 via the communication passage 31 by decompressing the inside of the mixer 16 with the decompression pump. Further, the mixer 16 is connected to a material supply device 40 via a communication passage 33. The material supply device 40 is configured to supply the virgin resin material to the mixer 16.

The predetermined ratio of mixing the recovered resin material and the virgin resin material in the mixer 16 is appropriately set according to the molded product. In the present embodiment, the ratio of the recovered resin material to the virgin resin material is set to 8:2.

Next, the pulverizer 20 will be described in detail. As shown in the schematic cross-sectional views of FIG. 8 and FIG. 9 in which the pulverizing unit 22 and the storage unit 25 (storage structure) are mainly shown and the hopper 21 is omitted, a rotary blade 221 is rotatably provided in the pulverizing unit 22. The rotary blade 221 has a plurality of blades 221*a* formed on its shaft. A mesh 222 is provided below the rotary blade 221. A lower side of the mesh 222 communicates with the storage case 23. The rotary blade 221 is continuously rotated by a motor (not shown). A rotation direction of the rotary blade 221 is a direction D1 in FIG. 8 so that the blades 221*a* can cut the waste material. The waste material supplied from the hopper 21 is sandwiched between the rotary blade 221 and the mesh 222 and pulverized by the blades 221*a* and then falls into the storage case 23. In this regard, the particle size of the pulverized material is about 5 mm to 10 mm in the present embodiment. Powderly pulverized material having a particle size of about 1 mm to 2 mm is also contained in an amount of about 5 to 10%.

Figure 8:
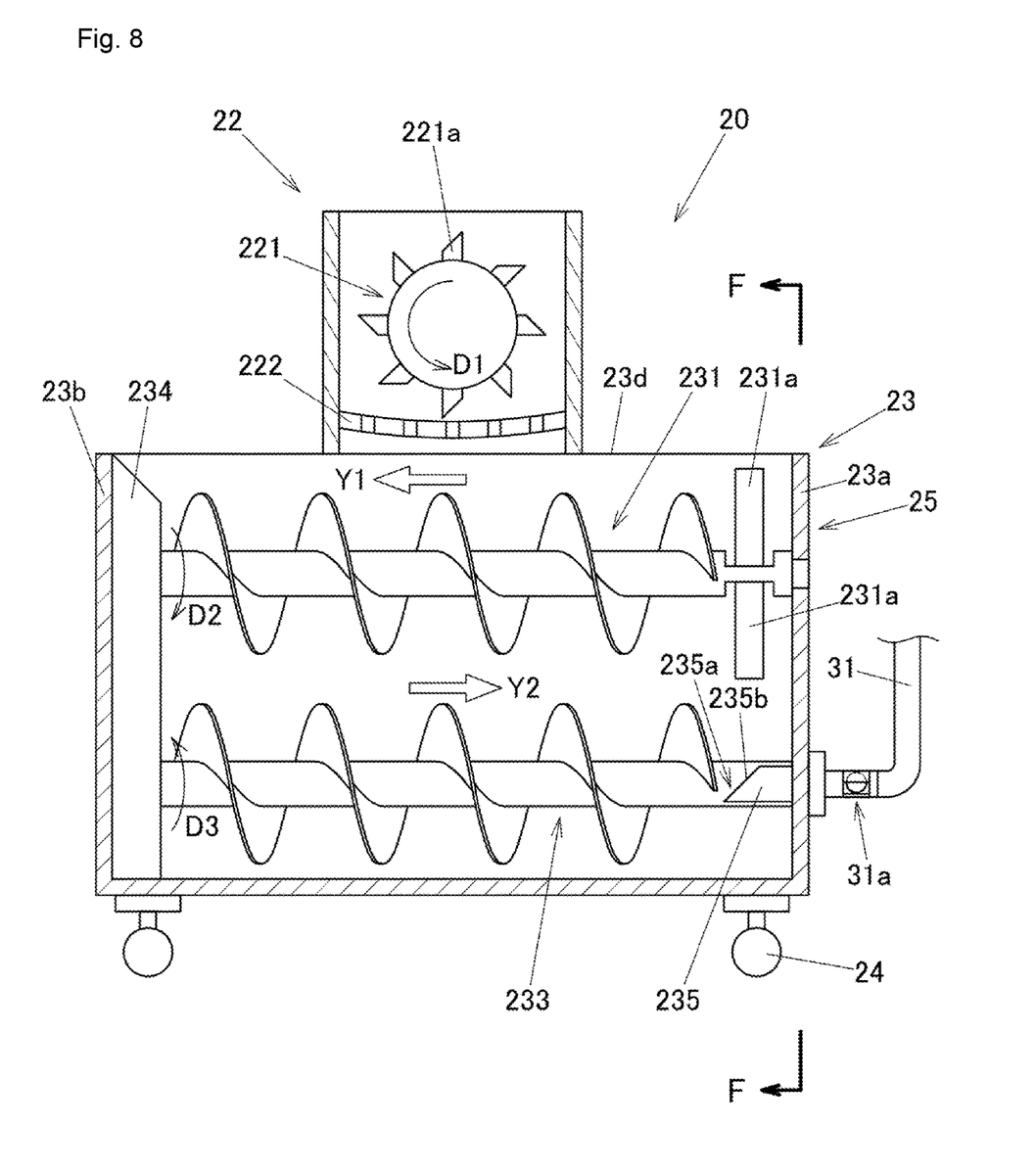
FIG. 8 is a schematic cross-sectional view taken along a line E-E in FIG. 9, showing the pulverizer according to the embodiment of the present invention.
Figure 9:
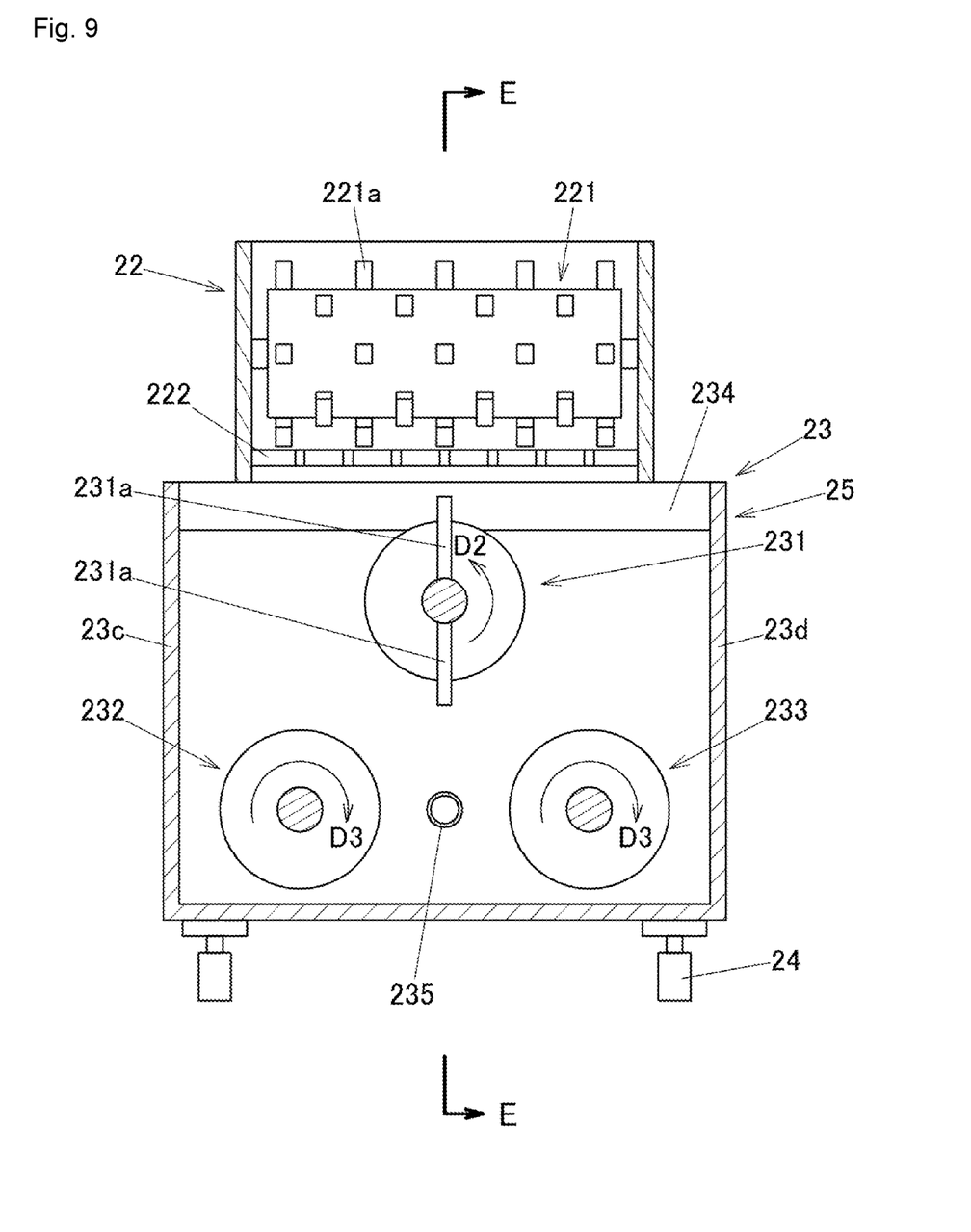
FIG. 9 is a schematic cross-sectional view taken along a line F-F in FIG. 8, showing the pulverizer according to the embodiment of the present invention.

The storage case 23 is formed in a box shape with an open top and side walls 23*a* to 23*d* standing on four sides. In the storage case 23, three screw blades, i.e., a first screw blade 231, a second screw blade 232, and a third screw blade 233 are rotatably arranged such that axial directions thereof are parallel to each other. In the present embodiment, the winding direction of the first screw blade 231, the second screw blade 232, and the third screw blade 233 is all right-handed. One end of the first screw blade 231, the second screw blade 232, and the third screw blade 233 is rotatably supported by the side wall 23*a*, which is a supporting side wall among the side walls 23*a*, 23*b* of the storage case 23 perpendicular to the axial direction of the first screw blade 231, the second screw blade 232, and the third screw blade 233. The other end of the first screw blade 231, the second screw blade 232, and the third screw blade 233 is connected and supported by a gear or the like (not shown) in a gearbox 234. One or more motors are built in the gearbox 234 to rotationally drive the first screw blade 231, the second screw blade 232, and the third screw blade 233.

The first screw blade 231, the second screw blade 232, and the third screw blade 233 are arranged such that the first screw blade 231 is arranged on an upper side, and the second screw blade 232 and the third screw blade 233 are arranged in the storage case 23 below the first screw blade 231 and at a predetermined distance horizontally away from the first screw blade 231. In other words, when the first screw blade 231, the second screw blade 232, and the third screw blade 233 are viewed from the axial direction, as shown in FIG. 9, the first screw blade 231, the second screw blade 232, and the third screw blade 233 are arranged in the storage case 23 such that each shaft center corresponds to vertices of a triangle in which the shaft center of the first screw blade 231 is the upper top vertex. Further, a flight portion 231*a* projecting outwardly in the radial direction is provided on one end side of the first screw blade 231. The flight portion 231*a* formed in the shape of a flat plate bar. The flight portion 231*a* is provided in pairs opposed to each other at the same axial position on the shaft of the first screw blade 231.

Figure 10:
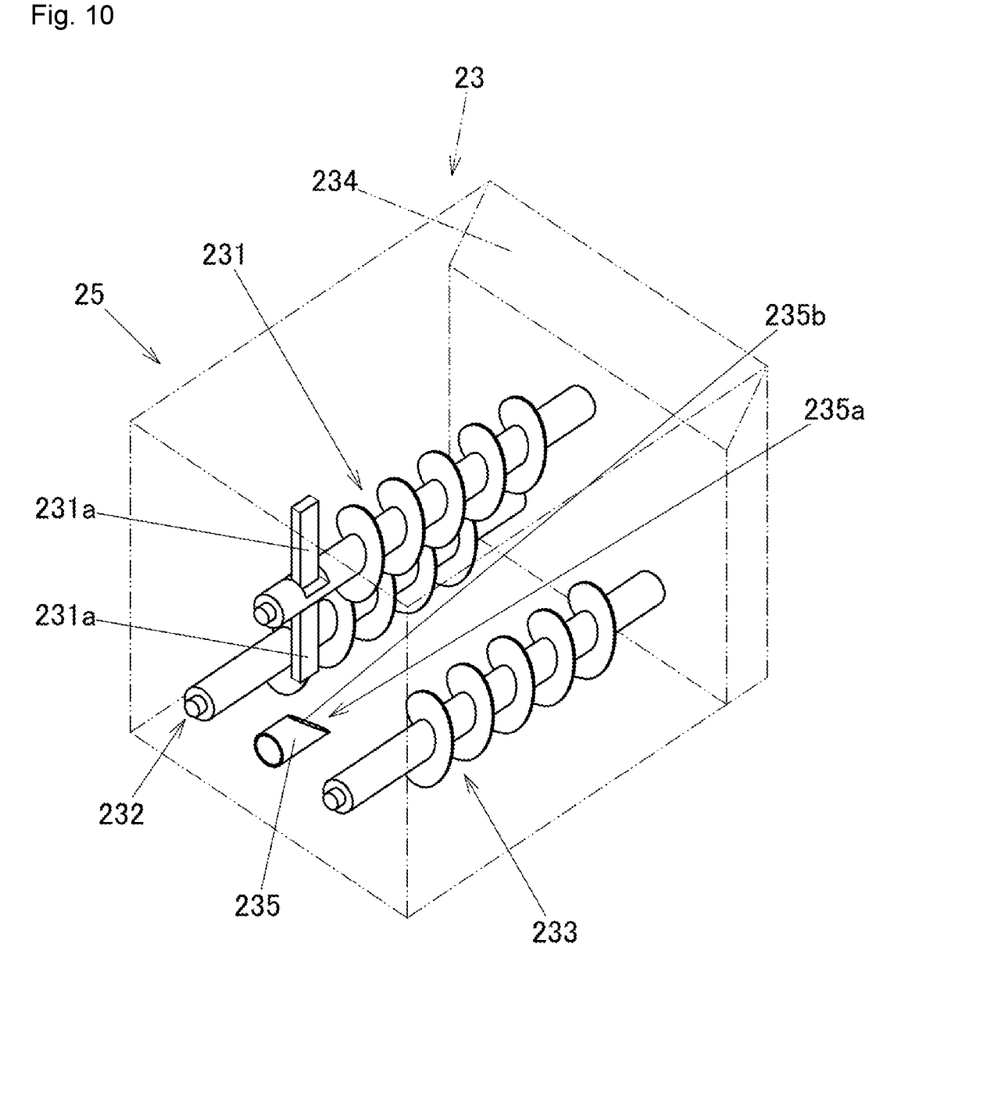
FIG. 10 is a perspective view schematically showing the arrangement of first, second, and third screw blades and a suction nozzle in the pulverizer according to the embodiment of the present invention.

The side wall 23*a* is provided with a suction nozzle 235 projecting in the storage case 23 to suck the pulverized material. The suction nozzle 235 is formed of a cylindrical pipe, as shown in FIG. 10, and has the same axial direction as the first screw blade 231, the second screw blade 232, and the third screw blade 233. The height of the axis of the suction nozzle 235 is arranged to be the same as the height of the shaft center of the second screw blade 232 and the third screw blade 233. Further, the suction nozzle 235 is arranged at the center position between the second screw blade 232 and the third screw blade 233. An opening 235*a* at the tip of the suction nozzle 235 is cut in an inclined plane. Further, the suction nozzle 235 is arranged such that an inclined opening surface 235*b* of the opening 235*a* (i.e., the surface including the cut surface of the pipe and the opening) faces upward. The flight portion 231*a* described above is arranged substantially directly above the opening 235*a*, corresponding to a position of the opening 235*a* of the suction nozzle 235. Consequently, it is possible to suppress the bridge that can be easily formed on an upper side of the opening 235*a* of the suction nozzle 235 sucking in the pulverized material.

The suction nozzle 235 is connected to the communication passage 31 to communicate with the mixer 16. The communication passage 31 is provided with a suction-force adjuster 31*a* capable of adjusting the suction force of the suction nozzle 235 outside and near the outer side of the side wall 23*a* of the storage case 23. The suction-force adjuster 31*a* in the present embodiment includes a hole formed on the communication passage 31 and a C-ring that allows the opening area of the hole to be adjusted. For this purpose, the communication passage 31 is made of a pipe material in the vicinity of the suction-force adjuster 31*a* and is connected to the mixer 16 by a flexible hose.

The arrangement of the first screw blade 231, the second screw blade 232, the third screw blade 233, and the suction nozzle 235 in the storage case 23 is illustrated in a perspective view of FIG. 10.

When the waste material is pulverized, the waste material is first fed into the hopper 21. The waste material then falls into the pulverizing unit 22. The waste material falling into the pulverizing unit 22 is pulverized by the rotary blade 221 and the mesh 222 to become the pulverized material. This pulverized material is accumulated and stored in the storage case 23 through the mesh 222. The lower limit of the accumulation level of the pulverized material in the storage case 23 (height in the storage case 23) is near the shaft center of the second screw blade 232 and the third screw blade 233, and the upper limit is the level in which the pulverized material does not overflow from the storage case 23 and does not come into contact with the mesh 222. The lower limit of the level of the pulverized material is set in this way, because, unless more than half the second screw blade 232 and the third screw blade 233 are buried in the pulverized material, it will be difficult to move the pulverized material by the second screw blade 232 and the third screw blade 233 and collect it around the suction nozzle 235. Further, it is important to set the upper limit of the level of the pulverized material so that the pulverized material cannot come into contact with the mesh 222, in addition to not overflowing from the storage case 23. This is because the pulverized material will melt and solidify around the rotary blade 221 when the pulverized material comes into contact with the mesh 222.

As shown in FIG. 9, the first screw blade 231 is rotationally driven in a counterclockwise direction D2 when viewed from one end side along the axial direction. On the other hand, the second screw blade 232 and the third screw blade 233 are rotationally driven in a clockwise direction D3, which is opposite to the rotational direction of the first screw blade 231. Therefore, the first screw blade 231 is configured to move the pulverized material from one end side to the other end side, as shown by an arrow Y1, and the second screw blade 232 and the third screw blade 233 are configured to move the pulverized material from the other end side to one end side as shown by an arrow Y2. In this way, the pulverized material in the storage case 23 moves to eventually gather around the suction nozzle 235, and thus the formation of a cavity around the suction nozzle 235 can be suppressed.

Further, the first screw blade 231 is provided with the flight portion 231a rotating together with the first screw blade 231. When the cavity is formed around the suction nozzle 235, the pulverized material around the cavity may solidify. The flight portion 231a can crush the pulverized material solidified and adhered and prevent further solidification and adhesion. Although the solidification and adhesion of the pulverized material (so-called bridge) is likely to occur particularly in the case of foamed material having a closed cell structure, the occurrence of the bridge can be suppressed by the configuration described above. Consequently, the work efficiency of blow molding can be improved.

Figure 11:
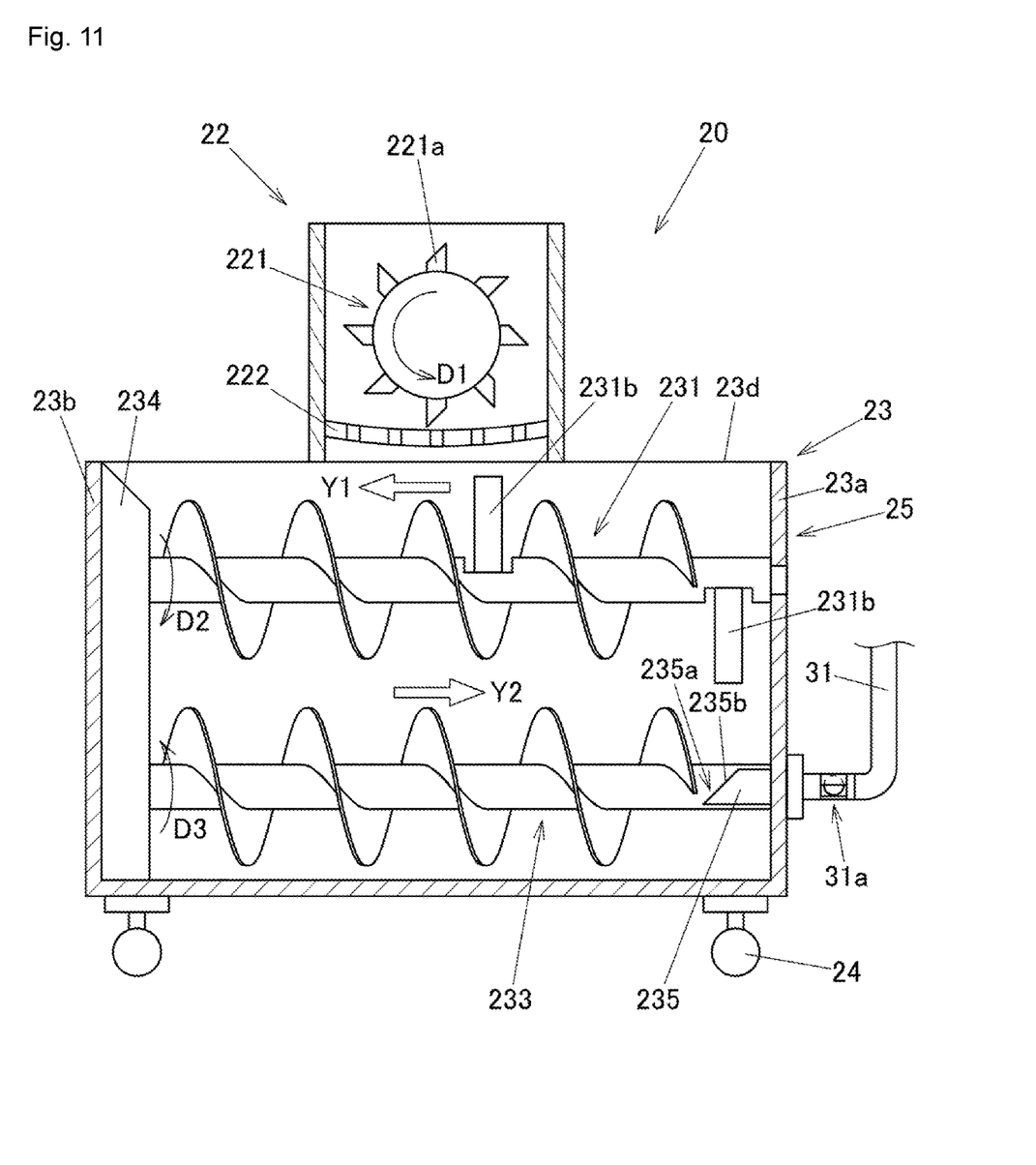
FIG. 11 shows a variation of a flight portion of the pulverizer according to the embodiment of the present invention.

The configuration of the flight portion 231a is not limited to the configuration in which a pair of flight portions 231a are provided at the same position on the shaft of the first screw blade 231 to be opposed to each other, and the flight portions 231b may be provided to be separated from each other on the shaft of the first screw blade 231, as shown in FIG. 11. The arrangement of the flight portions 231a, 231b can be appropriately determined according to the position where the bridge described above is likely to occur. In this regard, the rotation of the first screw blade 231 can be balanced by providing the flight portions 231a, 231b in pairs.

The embodiment of the present invention has been described above, and the present invention is not limited to the present embodiment and can be implemented with various modifications. For example, while the configuration including the three screw blades (the first screw blade 231, the second screw blade 232, and the third screw blade 233) is described in the present embodiment, the configuration is not limited thereto, and one, two, four or more screw blades may be provided. Further, while the first screw blade 231, the second screw blade 232, and the third screw blade 233 are all configured to be right-handed, the configuration is not limited thereto, and the winding direction and the rotation direction of the first screw blade 231, the second screw blade 232, and the third screw blade 233 may be respectively determined so that the flow of the pulverized material is formed inside the storage case 23. When, as in the present embodiment, the first screw blade 231 is configured to move the pulverized material from one end side to the other end side, and the second screw blade 232 and the third screw blade 233 are configured to move the pulverized material from the other end side to one end side, the pulverized material can be efficiently collected around the suction nozzle 235 arranged on one end side.

Further, while one end of the first screw blade 231, the second screw blade 232, and the third screw blade 233 are directly supported by the side wall 23a in the present embodiment, the configuration is not limited thereto, and one end of the first screw blade 231, the second screw blade 232, and the third screw blade 233 may be rotatably supported by a strut or the like. Further, the storage unit 25 including the storage structure may be configured as a separate unit from the pulverizer 20. In this case, the pulverized material generated at a different place can be transported and stored in the storage unit 25 configured as a separate unit.

REFERENCE SIGNS LIST

10: tubular molded body, 11: tube main body, 11a: inclined flat surface, 11b: perpendicular flat surface, 12: flange, 100: attachment flange, 110: fixed flange, 110a: upper surface, 110b: lower surface, 111: concave portion, 120: attachment flange main body, 121: first plate portion, 122: second plate portion, 123: third plate portion, 124: fourth plate portion, 125: attachment hole, 127a: welded portion, 127b: welded portion, 130: hinge, 135: recessed portion, 140: hinge protection portion, 141: left hinge-protection portion, 141a: upper surface, 141b: lower surface, 141c: tip portion, 142: right hinge-protection portion, 142a: upper surface, 142b: lower surface, 142c: tip portion, 150: side plate portion, 151: left side-plate portion, 152: right side-plate portion, 1: blow molding system, 15: blow molding machine, 16: mixer, 16a: opening/closing cylinder, 17: extruder, 18: head, 18a: parison, 20: pulverizer, 21: hopper, 22: pulverizing unit, 23: storage case, 23a-23d: side wall, 24: caster, 25: storage unit, 31: communication passage, 31a: suction-force adjuster, 32: communication passage, 33: communication passage, 40: material supply device, 50: mold, 221: rotary blade, 221a: blade, 222: mesh, 231: first screw blade, 231a: flight portion, 231b: flight portion, 232: second screw blade, 233: third screw blade, 234: gearbox, 235: suction nozzle, 235a: opening, 235b: opening surface

The invention claimed is:
1. A tubular molded body, comprising:
a tube main body formed in a tubular shape; and
an attachment flange formed in a flange shape to project from the tube main body, the attachment flange comprising a thin-walled hinge and being rotatable by the thin-walled hinge, wherein a hinge protection portion is formed on the tube main body near an end of the thin-walled hinge, a tip portion of the hinge protection portion is formed on a projecting side of the attachment flange beyond the thin-walled hinge, a thin-walled side plate portion is provided between the hinge protection portion and the attachment flange and extends from the end of the thin-walled hinge in the projecting direction of the attachment flange.

2. The tubular molded body of claim 1, wherein the attachment flange comprises:
a fixed flange formed to project from the tube main body; and
an attachment flange main body connected to the fixed flange via the thin-walled hinge.

3. The tubular molded body of claim 2,
wherein the attachment flange main body is formed in a bent shape.

4. A tubular molded body, comprising:
a tube main body formed in a tubular shape; and
an attachment flange formed in a flange shape to project from the tube main body, the attachment flange comprising a thin-walled hinge and being rotatable by the thin-walled hinge, wherein the attachment flange comprises a fixed flange formed to project from the tube main body; an attachment flange main body connected to the fixed flange via the thin-walled hinge, and the attachment flange main body is formed in a bent shape.

* * * * *